(12) United States Patent
Domlatil

(10) Patent No.: US 10,390,539 B2
(45) Date of Patent: Aug. 27, 2019

(54) DEVICE FOR SEPARATING INDIVIDUAL SAUSAGES SEPARATED FROM ONE ANOTHER BY TWIST POINTS

(71) Applicant: INOTEC GMBH MASCHINENENTWICKLUNG UND VERTRIEB, Reutlingen (DE)

(72) Inventor: Miroslav Domlatil, Reutlingen (DE)

(73) Assignee: INOTEC GMBH MASCHINENENTWICKLUNG UND VERTRIEB, Reutlingen (DE)

( * ) Notice: Subject to any disclaimer, the term of this patent is extended or adjusted under 35 U.S.C. 154(b) by 0 days.

(21) Appl. No.: 16/077,201

(22) PCT Filed: Feb. 9, 2017

(86) PCT No.: PCT/EP2017/052801
§ 371 (c)(1),
(2) Date: Aug. 10, 2018

(87) PCT Pub. No.: WO2017/137464
PCT Pub. Date: Aug. 17, 2017

(65) Prior Publication Data
US 2019/0029276 A1    Jan. 31, 2019

(30) Foreign Application Priority Data
Feb. 11, 2016  (DE) .................. 10 2016 102 372

(51) Int. Cl.
*A22C 11/00*  (2006.01)
(52) U.S. Cl.
CPC .......... *A22C 11/006* (2013.01); *A22C 11/008* (2013.01)
(58) Field of Classification Search
CPC ..... A22C 11/00; A22C 11/003; A22C 11/006; A22C 11/008; A22C 11/02; A22C 11/0209; A22C 11/0245

USPC ............... 452/21–26, 30–32, 35–37, 46–51; 53/549, 435, 514, 517
See application file for complete search history.

(56) References Cited

U.S. PATENT DOCUMENTS

| | | | | |
|---|---|---|---|---|
| 2,800,681 A | * | 7/1957 | Demarest ............. | A22C 11/003 452/31 |
| 5,173,075 A | * | 12/1992 | Wadell ................. | A22C 11/001 452/46 |
| 5,857,902 A | * | 1/1999 | Becker ................. | A22C 11/006 452/49 |

(Continued)

FOREIGN PATENT DOCUMENTS

| | | |
|---|---|---|
| DE | 3535960 C1 | 2/1987 |
| DE | 4307637 C2 | 4/1995 |

OTHER PUBLICATIONS

International search report for patent Application No. PCT/EP2017/052801 dated Apr. 3, 2017.

*Primary Examiner* — Richard T Price, Jr.
(74) *Attorney, Agent, or Firm* — Bachman & LaPointe, PC

(57) ABSTRACT

A device for separating individual sausages (12), which are separated from one another by twist points (15), at a cutting point (5), wherein a sensor (6) for detecting the twist point (15) is connected upstream of the cutting point (5), wherein, upstream of the cutting point (5), there is positioned at least one further sensor (7) which runs parallel to the sensor (6) and which is located closer to the cutting point (5) than the sensor (6), wherein the sensors (6, 7) each generate an infrared light shell.

4 Claims, 2 Drawing Sheets

(56) References Cited

U.S. PATENT DOCUMENTS

| | | | | |
|---|---|---|---|---|
| 6,045,445 | A * | 4/2000 | Hummel | A22C 11/006 452/46 |
| 6,106,878 | A * | 8/2000 | Stimpfl | A22C 11/006 219/121.67 |
| 7,553,222 | B2 * | 6/2009 | Jackel | A22C 11/0245 452/38 |
| 8,162,729 | B2 * | 4/2012 | Bilowski | A22C 11/008 452/49 |
| 8,231,442 | B2 * | 7/2012 | Baechtle | A22C 11/10 452/49 |
| 2013/0313072 | A1 * | 11/2013 | van de Loecht | B65G 54/02 198/464.1 |

* cited by examiner

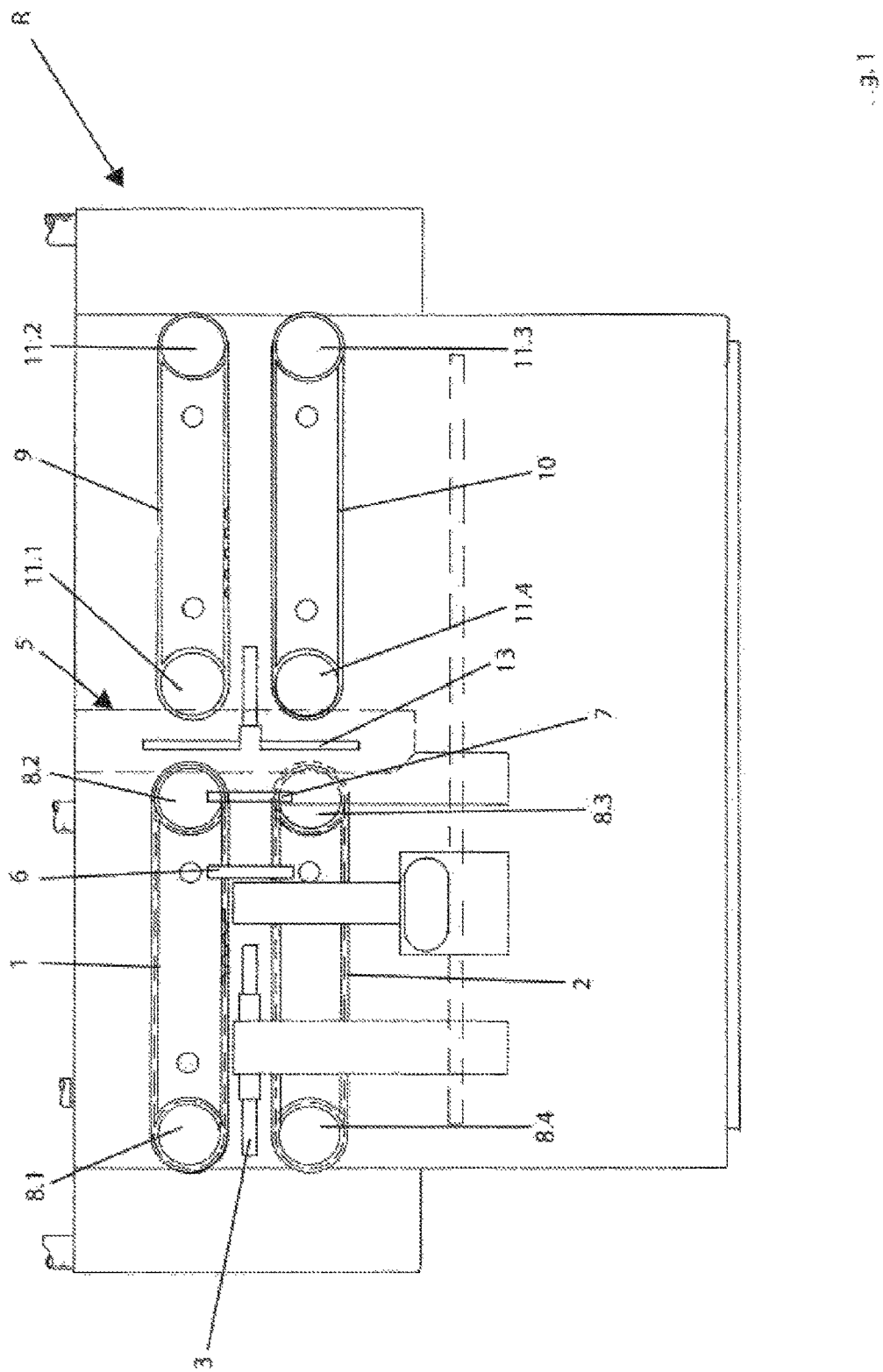

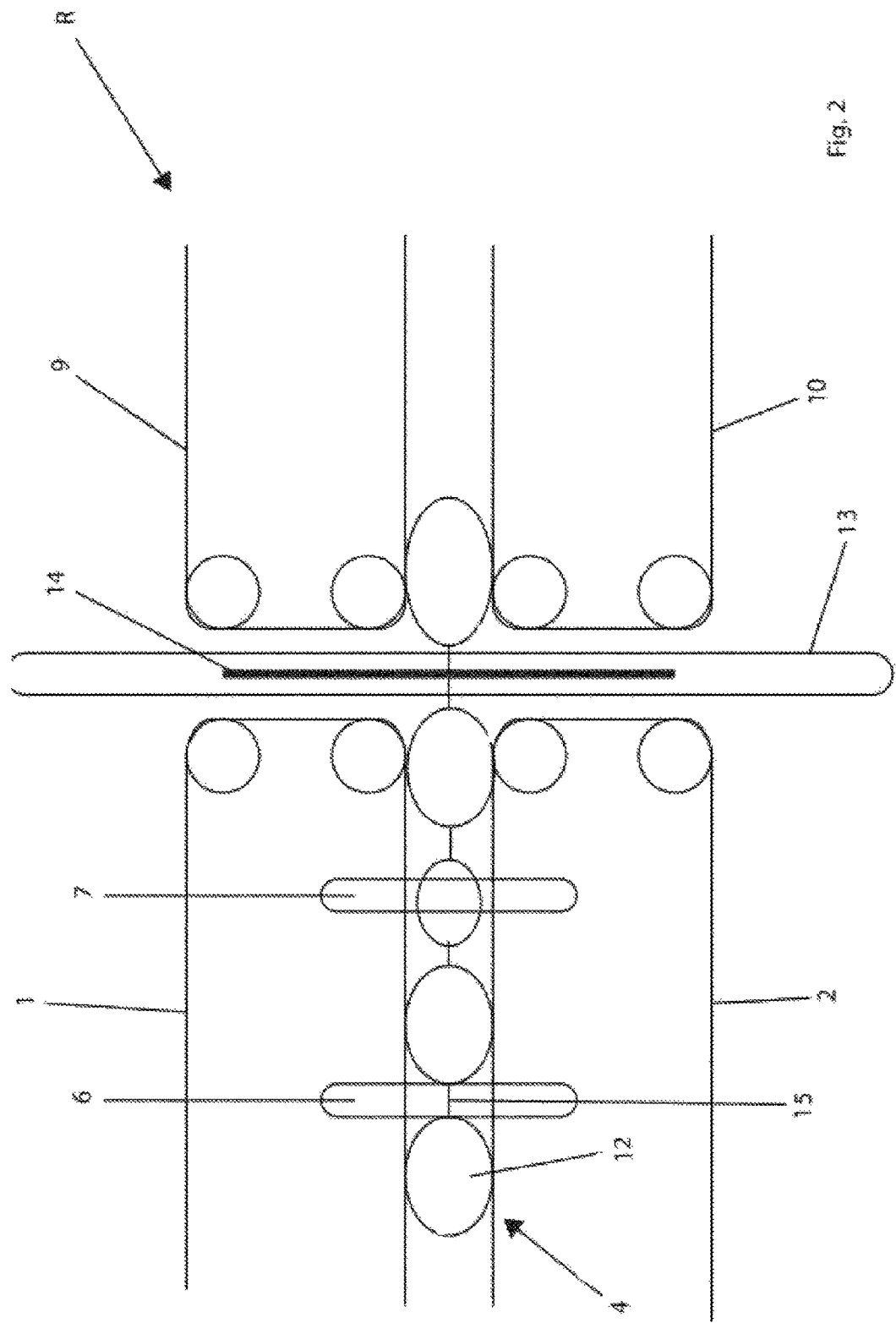

DEVICE FOR SEPARATING INDIVIDUAL SAUSAGES SEPARATED FROM ONE ANOTHER BY TWIST POINTS

BACKGROUND OF THE INVENTION

The invention relates to a device for separating individual sausages, which are separated from one another by twist points, at a cutting point, wherein a sensor for detecting the twist point is positioned upstream of the cutting point.

PRIOR ART

Sausages are nowadays produced by virtue of an intestine, be it natural or synthetic intestine, being filled with the corresponding sausage meat in sausage portions. Between the individual portions, the intestine is rotated, and/or clips are used, by means of which the individual sausages are divided from one another. This gives rise to a twist point, from which said sausages must be cut off at a later point in time, for example for the automatic packaging of a particular number of sausages.

Over the years, the technology has been further developed, and DE 43 07 637 C2 presents a device by means of which, in a simple manner, absolutely exact separation of the sausages from a band of sausages or chain of sausages, and also an automatic feed of the separated sausages to a packaging device in the cycle times of said packaging device, are performed. In this invention, it is described that a sensor generates an infrared light curtain. By means of such an infrared light curtain, the sensor can detect the twist point between two sausages much more accurately, and transmit the position to the cutting point.

By means of this innovation, it was possible to realize an enormous increase in the production process, which had a great effect on the profitability of a company.

Problem

The problem addressed by the present invention is that of operating in a technologically even more sophisticated and precise manner and increasing the speed of the production process.

Solution to the Problem

Said problem is solved in that at least one further sensor is positioned upstream of the cutting point.

By means of a further sensor, the twist point of the sausages can be determined with even greater accuracy, and thus a precise cut or a precise separation of the sausages can be performed. Said further sensor may be used on its own, even without the first sensor. This applies in particular for relatively short chains of sausages. Here, said second sensor is preferably placed closer to the cutting point.

In another embodiment of the invention, the second sensor may also operate together with the first sensor. Said second sensor detects the twist point once again, and compares the data with the preceding first sensor in order to permit perfect accuracy of the cut.

An advantage is therefore that the two sensors may be operated independently of one another or else in combination. Depending on the chain of sausages, a corresponding setting is performed in order to be able to detect an exact position of the twist point. High precision and thus high cutting accuracy are thus ensured. Thus, less waste is produced as a result of incorrect cuts, and profitability is thus increased.

Furthermore, the second sensor solves the problem if the sausages in a chain of sausages have different diameters. For example, if a sausage with a relatively small diameter follows a sausage with a relatively large diameter, said sausage will not be held firmly between the two transport belts during the cutting of the sausage with the relatively large diameter, but rather will be pulled forward during the cutting of the twist point between the sausage with the relatively large diameter and the sausage with the relatively small diameter. This however means that the following twist point between the sausage with the relatively small diameter and the following sausage is no longer correct. For this purpose, the second sensor is used to determine an exact position of the twist point.

The second sensor is located, in exactly the same way as the first sensor, perpendicular to the running surface and thus parallel to the first sensor. Only in this way can a chain of sausages pass through both sensors.

The sensors generate an infrared light shell which scans the twist point of the chain of sausages and transmits the position of the twist point to the cutting point. The infrared light shell ascertains the twist points of the chain of sausages in a precise manner, and said twist points can thus be cut with the highest accuracy.

FIGURE DESCRIPTION

Further advantages, features and details of the invention will emerge from the following description of preferred exemplary embodiments and from the drawing; in which FIG. 1 shows a plan view of a device according to the invention for separating sausages;

FIG. 2 shows a plan view of an enlarged detail of the device as per FIG. 1.

DETAILED DESCRIPTION

As per FIG. 1, a device R according to the invention for separating sausages 12 (see FIG. 2), which are lined up as a chain of sausages 4 and separated by a twist point, has two transport belts 1 and 2, which are arranged with a variable spacing to one another and which are formed as endless doubly toothed belts. They run around diverting rollers 8.1-8.4.

Also shown is a hold-down means 3 which is intended to hold the chain of sausages 4 in the path. Between the hold-down means 3 and a cutting point 5 indicated by dashed lines, there are arranged a sensor 6 and a sensor 7, as per FIG. 1.

The sensors 6 and 7 are positioned upstream of the cutting point 5. They control a servo motor (not shown in more detail) for a cutting blade 14. Here, the sensor 6 is arranged approximately 100 mm upstream of a slot 13 through which the cutting blade 14 enters and exits, in order that adequate time is available to transmit a signal for cutting to the blade 14. The slot 13 extends transversely with respect to the conveying direction of the chain of sausages 4, and is arranged downstream of the transport belt pair 1 and 2.

The sensors 6 and 7 are likewise arranged transversely with respect to the conveying direction of a chain of sausages 4. An infrared emitter, already described in DE 43 07 637 C2, of the sensors 6 and 7 generates, by means of light-emitting diodes, a multiplicity of beams a light curtain, which is passed through by the sausage 12 and in particular by the twist point 15 between the sausages.

The cutting point 5 is followed by two further transport belts 9 and 10, which are formed as singly toothed belts. In this case, too, corresponding diverting rollers 11.1-11.4 are provided. Said transport belts 9 and 10 serve for transporting the sausages 12 separated from the chain of sausages 4 at the cutting point 5 individually onward.

The transport belt pairs 1/2 and 9/10 may be driven at equal or different speeds. If the transport belt pair 9/10 has a slightly higher speed than the transport belt pair 1/2, the chain of sausages 4 is tensioned slightly in the region of the cutting point 5, such that an even more reliable cut can be performed.

Various further functions and components have already been discussed in DE 43 07 637 C2, to which particular reference is made and which is integrated into this document, and these will not be described in any more detail here.

The functioning of the present invention is as follows:

A chain of sausages 4 is threaded into the device R for separating sausages 12. Here, said chain of sausages is engaged and transported onward by the transport belt pair 1 and 2. If the sausage 12 has for example a length of approximately 70 mm, it can be easily held by the transport belts 1 and 2, and the sensor 6 detects the twist point 15 between two sausages 12, calculates the length thereof, and transmits a signal approximately for the center of the twist point to the blade 14, which cuts the chain of sausages 4 with the greatest possible accuracy at the twist point 15. This takes place for example 30 times per second in the case of a belt speed of 2.1 m/s. For this purpose, enormous processing power is necessary in order to evaluate the image scanned at the twist point, calculate the center of the twist point, and impart the cutting impetus to the cutting blade. Furthermore, the blade must also mechanically withstand the cutting movement.

In the case of relatively small sausages 12 such as for example mini salami sausages, which have for example only a length of approximately 30 mm, incorrect cuts occur with these settings, because the speed, and likewise the number of twist points passing through the sensor 6, are too high. That is to say, in the case of sausages of smaller length, the belt speed must be reduced. Because the twist point 15 moves more slowly, it is possible to greatly reduce the distance between the sensor 7 and the cutting point 5.

Furthermore, great problems arise if the sausages in a chain of sausages have different diameters. For example, if a sausage with a relatively small diameter follows a sausage with a relatively large diameter, said sausage will not be held firmly between the two transport belts during the cutting of the sausage with the relatively large diameter, but rather will be pulled forward during the cutting of the twist point between the sausage with the relatively large diameter and the sausage with the relatively small diameter. This however means that the following twist point between the sausage with the relatively small diameter and the following sausage is no longer correct.

According to the invention, here, the sensor 7 is also used, which detects the twist point once again and correlates the data with the data determined by the sensor 6, such that a correct cutting process can be performed.

List of reference designations

| | |
|---|---|
| 1 | Transport belt |
| 2 | Transport belt |
| 3 | Hold-down means |
| 4 | Chain of sausages |
| 5 | Cutting point |
| 6 | Sensor |
| 7 | Sensor |
| 8 | Diverting rollers |
| 9 | Transport belt |
| 10 | Transport belt |
| 11 | Diverting rollers |
| 12 | Sausages |
| 13 | Slot |
| 14 | Blade |
| 15 | Twist point |
| 34 | |
| 35 | |
| 36 | |
| 37 | |
| 38 | |
| 39 | |
| 40 | |
| 41 | |
| 42 | |
| 43 | |
| 44 | |
| 45 | |
| 46 | |
| 47 | |
| 48 | |
| 67 | |
| 68 | |
| 69 | |
| 60 | |
| 71 | |
| 72 | |
| 73 | |
| 74 | |
| 75 | |
| 76 | |
| 77 | |
| 78 | |
| 79 | |

The invention claimed is:

1. A device for separating individual sausages (12), which are separated from one another by twist points (15), at a cutting point (5), wherein a sensor (6) for detecting the twist point (15) is connected upstream of the cutting point (5), wherein, upstream of the cutting point (5), there is positioned at least one further sensor (7) which runs parallel to the sensor (6) and which is located closer to the cutting point (5) than the sensor (6), wherein the sensors (6, 7) each generate an infrared light shell.

2. The device as claimed in claim 1, wherein the sensors (6, 7) are operable individually.

3. The device as claimed in claim 1, wherein the two light curtains of the sensors (6, 7) can be used in combination.

4. A method for separating individual sausages (12), which are separated from one another by twist points (15), at a cutting point (5), wherein the twist point (15) is firstly detected by a first sensor (6),
wherein
the twist point (15) is subsequently detected once again by a second sensor (7), wherein said second sensor (7) is located closer to the cutting point (5) than the first sensor (6),
wherein data detected by the second sensor (7) are compared with data detected by the first sensor (6), in order to detect an exact position of the twist point (15).

* * * * *